United States Patent

[11] 3,598,219

[72] Inventors Ronald Henry Lee
Stevenage;
Dennis Frank Edwin Pidgeon, Letchworth;
Thomas Drew Powrie, Stevenage; John
Henry Coyne, Letchworth, all of, England
[21] Appl. No. 708,922
[22] Filed Feb. 28, 1968
[45] Patented Aug. 10, 1971
[73] Assignee International Computers and Tabulators
Limited
London, England
[32] Priority Mar. 8, 1967
[33] Great Britain
[31] 10,793/67

[54] APPARATUS FOR POSITIONING RECORDS
2 Claims, 6 Drawing Figs.
[52] U.S. Cl. .................................................. 197/133
[51] Int. Cl. ..................................................... B41j 15/00
[50] Field of Search ......................................... 197/19, 20,
133, 133 F, 134; 226/9

[56] References Cited
UNITED STATES PATENTS
| | | | |
|---|---|---|---|
| 2,747,717 | 5/1956 | Cunningham et al. ......... | 197/133 |
| 2,872,025 | 2/1959 | Thienemann .................. | 197/20 X |
| 2,884,852 | 5/1959 | Saltz .............................. | 197/133 X |
| 3,042,178 | 7/1962 | West .............................. | 197/133 |
| 3,043,589 | 7/1962 | Folmar .......................... | 197/133 X |
| 3,094,261 | 6/1963 | Thompson ..................... | 197/133 X |
| 3,176,819 | 4/1965 | Bloom et al. .................. | 197/133 |
| 3,452,853 | 7/1969 | Mabon .......................... | 197/133 |

FOREIGN PATENTS
1,030,158  5/1966  Great Britain ................  197/133

*Primary Examiner*—Ernest T. Wright, Jr.
*Attorney*—Hane & Baxley

ABSTRACT: An arrangement for controlling the positioning of a record, typically for controlling the position of a sheet in relation to a line printer, by means of a program tape advanced in synchronism with the record is described. The program tape is advanced under control of an impulse-driven electric motor, the driving pulses for the motor being derived from a pulse generator included within the record feeding arrangement. The program tape carries perforations indicative of those positions in which the record is to be stopped for the purpose, for example, of receiving lines of print. The perforations in the tape are sensed photoelectrically to control the record feeding arrangement.

A two-speed drive is used to feed the record and in one embodiment, which uses two tape-sensing stations, the record, if it is being fed at the higher speed, is slowed down in response to the output from one (advanced) sensing station and is finally brought to rest in response to the output from the second sensing station. In starting up the record-feeding device, a circuit arrangement using a counter is employed. The record movement is started at the slower speed and the counter permits the movement to continue at the higher speed provided that a stop signal is not sensed from the tape within a distance determined by the capacity of the counter.

In another embodiment a third tape-sensing station is added to provide more advanced information on the occurrence of a stop signal in the tape, and the record-feeding device is coupled to the higher speed drive upon starting unless a stop signal is detected within the area of tape scanned by the advanced sensing stations.

INVENTORS
RONALD HENRY LOE
DENNIS FRANK EDWIN PIDGEON
THOMAS DREW POWRIE
JOHN HENRY COYNE
BY Hame and Baxley
ATTORNEYS INVENTORS
RONALD HENRY LEE
DENNIS FRANK EDWIN PIDGEON
THOMAS DREW POWRIE
JOHN HENRY COYNE
BY Horne and Bailey
ATTORNEYS

APPARATUS FOR POSITIONING RECORDS

BACKGROUND OF THE INVENTION

The present invention relates to apparatus for positioning records, and in particular to apparatus used in conjunction with printing apparatus for positioning documents and other stationary during a sequence of printing operations.

Record feeding merely by a drive having driving inputs respectively running at more than one speed have previously been proposed, for example, as shown in U.S. Pat. No. 3,315,860. It has also previously been proposed to use a program tape which is sensed photoelectrically to control the positioning of a record in relation to a line printer, as shown, for example, in U.S. Pat. No. 2,747,717.

Hitherto, the synchronization of the tape-advancing device with the record feeding means has involved the use of fairly complex mechanical gearing trains. Moreover, in relation to modern high-speed devices, of which output printers for use with high-speed data processing devices are typical, it is highly desirable to take as little time as possible in merely moving the record from one printing position to the next in order to be able to employ the printing device for as great a time as possible actually in the operation of printing.

SUMMARY

In order to improve the performance of the record-printing apparatus outlined in the preceding paragraph it is now an object of the present invention to simplify the manner in which the record and the program tape are maintained in synchronism. A further object of the invention is to improve the manner in which a relatively high record-feeding speed is selected when feeding of the record is initiated.

According to the present invention record-position-controlling apparatus includes a program tape bearing at least one indicium; means for advancing said program tape in a direction parallel to its length; a motor operable in response to electrical impulses coupled to drive said tape-advancing means; first and second sensing stations spaced apart along the length of the tape, each station respectively producing a signal in response to sensing of an indicium from said tape; means for feeding a record; two-speed driving means; coupling means between said driving means and the record-feeding means, said coupling means being operable to transmit drive to the record-feeding means at a selected one of two speeds, the coupling means including means for generating electrical impulses at a frequency dependent upon the selected feed; means for applying said electrical impulses to said motor to synchronize movement of the record and said program tape; and control means for operating said coupling means, including means for selecting the faster of said two speeds, speed-modifying means responsive to a signal produced by said first sensing station to modify the operation of said coupling means to select the slower of said two speeds, and means responsive to a signal produced by said second sensing station to disable said coupling means to bring to rest a record being fed.

DESCRIPTION OF PREFERRED EMBODIMENTS

Figure 1:
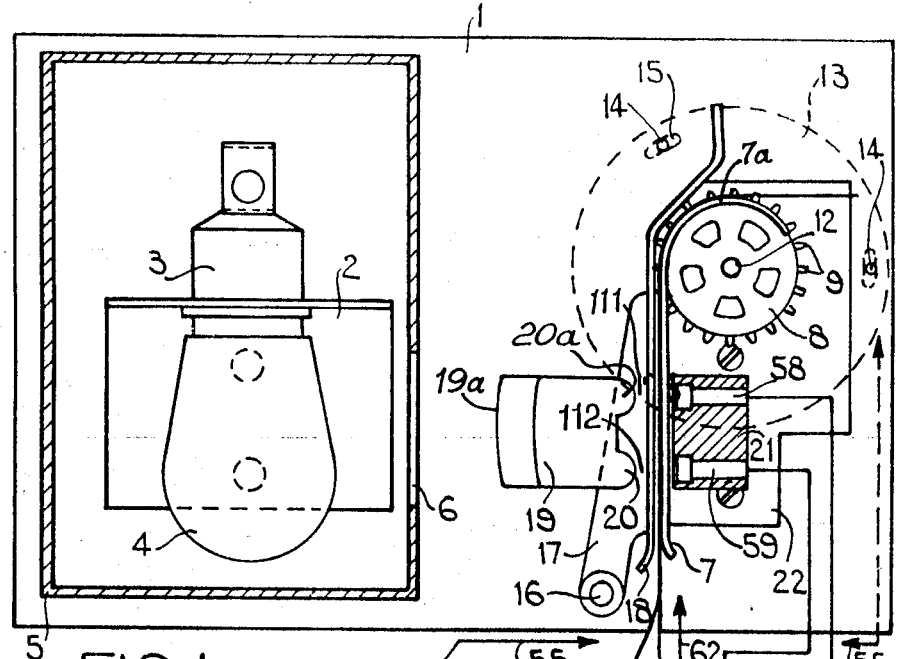
FIG. 1 shows, partly in schematic form, an arrangement for feeding and sensing a program tape.

Referring now to FIG. 1, a baseplate 1 carries a bracket 2, holding a lampholder 3 in which is a lamp 4. The entire lampholder 3 and lamp 4 are enclosed in a box 5 having an opening 6 in one side. The baseplate 1 also supports a tape guide 7 substantially parallel with the side of the box 5 having the opening 6. The end 7a of the guide 7 is slotted and is curved to follow the periphery of a tape feeding sprocket wheel 8, the wheel 8 being accommodated in the slot of end 7a. The wheel 8 has projections 9 about its periphery, the projections 9 being arranged to engage with feed holes 11 in a program tape 10 in the conventional manner in the direction of arrow 62. The wheel 8 is mounted on the shaft 12 of a stepping motor 13, which is secured by means of screws 14 to the opposite side of the baseplate 1. The screws 14 pass through slots 15 in the baseplate 1, the slots 15 allowing the angular adjustment of the motor 13, and hence of the sprocket wheel 8.

A pivot 16 carried by the baseplate 1 supports a bracket 17, which in turn supports a second tape guide 18 in a position normally spaced a small distance away from the guide 7. The pivot 16 allows the guide 18 to be swung away from the guide 7 to facilitate the loading of the tape 10 into the device.

Between the opening 6 in the side of the box 5 and the guide 18 a transparent refracting block 19 is supported from the base plate 1. The block 19 has a convex surface 19a facing towards the opening 6. The opposite face of the block 19 is integrally formed into a pair of semicylindrical lenses 20 and 20a. The lenses 20 and 20a are parallel to each other and are arranged at right angles to the longitudinal axis of the tape 10, so that light from the opening 6 is gathered by the block 19, is divided into two paths and each path is terminated by one of the lenses 20 and 20a to produce a pair of spaced-apart parallel bars of light across the tape 10, apertures (not shown) provided being in the guide 18 to allow light to reach the tape 10. The positions of the bars of light at the tape 10 define the locations of a pair of spaced-apart sensing stations 111 and 112. Sensing station 111 contains a number of photocells, one of which is shown as photocell 58, and also contains lens 20a. Similarly sensing station 112 contains a number of photocells, one of which is shown as photocell 59, and also contains lens 20. The photocells 58, 59 associated with each sensing station 111, 112 are arranged across the width of the tape 10. Thus, a number of photocells associated with sensing station 111, one photocell being shown as photocell 58, are arranged across the width of tape 10. All photocells 58, 59 are mounted in block 21 which is mounted on a bracket 22 and secured to the baseplate 1. The photoelectric cells 58 of station 111 are connected to amplifiers 60 in the conventional manner, and those of station 112 are connected to amplifiers 61, to provide output signals for control purposes.

Information is carried by the tape 10 in the form of perforations 23 which may be arranged in tracks along the tape 10, and each sensing station 111, 112 may be provided with a separate photoelectric cell 58, 59, respectively for each track. Information carried by a program tape 10 in this way is well known and consists, for example, of indicia relating to operations to be performed in the printing of a record 25 under control of further apparatus associated with the tape reading arrangement. A program tape 10 of this kind is, for example, commonly used to control the program of printing required on a record 25 or other document to be printed, and the indicia, such as the perforations 23, relates to positions at which the progress of the record 25 through the printing apparatus is to be halted. In such cases it is usual to arrange that the tape 10 is formed into a continuous loop.

Figure 2:
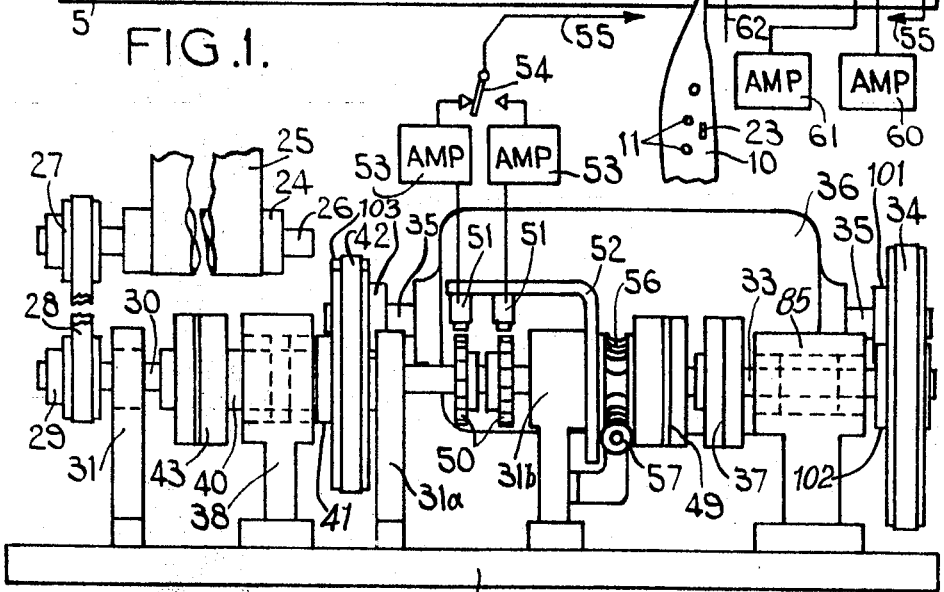
FIG. 2 shows, partly in schematic form, an arrangement for feeding a record.

In the present apparatus, FIG. 2 shows an arrangement for feeding a record 25. Referring now to this figure, a record 25 is fed by plate 24 mounted on a shaft 26 which is driven by a pulley 27. The pulley 27 is coupled by a belt 28 to a further pulley 29 mounted on a shaft 30. The shaft 30 forms the output shaft of a coupling arrangement and is mounted in bearings 31 supported on a base 32.

A further shaft 33 is supported in bearings 85 axially in line with the shaft 30, and the shaft 33 is driven by a belt drive 34 from the shaft 35 of a main drive motor 36. A conventional electromagnetic clutch 37 is interposed between shafts 30 and 33, so that upon electrical energization of the clutch 37 drive is transmitted from the shaft 33 to the shaft 30.

Figure 3:
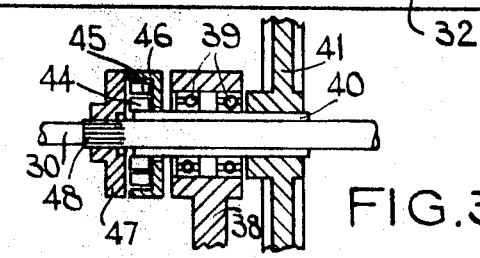
FIG. 3 shows a sectional view of part of the arrangement of FIG. 2.

A second clutching arrangement is provided in association with the shaft 30, and this arrangement is shown in greater detail in FIG. 3. A bracket 38 houses bearings 39 supporting a sleeve 40, and the sleeve 40 is driven by means of pulley 41 and a belt 42 from motor shaft 35, the motor 36 having a double-ended drive for this purpose, with the motor shaft 35 and the motor 36 shown in FIG. 2. A pulley 101 is mounted on one end of shaft 35 and is coupled to pulley 102 on shaft 33 by belt 34. Similarly, pulley 103 mounted on the other end of shaft 35 is coupled to pulley 41 on a shaft 30 by belt 42. The reference numerals 41, 101, 102 and 103 for convenience refer to the hubs of the respective pulleys with the actual size of the pulleys being chosen such that sleeve 40 rotates at a considerably greater speed than shaft 33. Thus, pulley 102 is larger than a corresponding pulley 41, while pulleys 101 and 103 may be of equal size, or pulley 103 may be larger than pulley 101. The pulley system described above is typical of a conventional apparatus for driving two shafts, 30 and 33, at different speeds from a single drive shaft, 35, rotating at a constant speed. A conventional electromagnetic clutch 43, similar to the clutch 37, is interposed between the sleeve 40 and the shaft 30.

The construction of the clutch 43 is shown in greater detail in FIG. 3. An iron ring, or rotor 44 is secured to the sleeve 40. The ring 44 is surrounded by a ring coil 45 which is housed in a recessed iron member 46, the member 46 being held stationary. An armature 47 is loosely fitted on splines 48 on the shaft 30. It will be seen that upon energization of the coil 45, the armature 47 is attached towards the ring 44, the recessed member 46 providing a magnetic circuit about the coil 45. In the operated position the armature 47 is engaged by the ring 44 so that the drive from the sleeve 40 is transmitted through the ring 44 and the armature 47 to the shaft 30.

Thus, by appropriate selection of one of the clutches 37 or 43, the output shaft 30 may be driven at a low or high speed. A conventional electromagnetic brake 49 (FIG. 2) is provided on the shaft 30. The brake 49 is similar in construction to the clutches 37 and 43 except that in the case of the brake 49 the iron ring forming the rotor 44, as described in the preceding paragraph, is held stationary by a worm drive wheel 56, the wheel 56 being prevented from rotating by a worm 57.

The shaft 30 also drives a pair of pulse generators each of which has a toothed wheel 50 of magnetic material secured to the shaft 30 and mounted in bearings 31a and 31b. Each wheel 50 is associated with a sensing head 51 supported on a bracket 52. Each toothed wheel 50 together with its sensing head 51 forms a pulse generator of the kind commonly termed a "sonic wheel" generator. The sensing head 51 may contain a magnet and a pickup coil. In such a case, as the toothed wheel 50 rotates with the shaft 30, the passage of a tooth past the sensing head 51 modifies the magnetic field of the head 51 and a resultant electrical signal is generated in the pickup of the head 51. The signals from the heads 51 are amplified by amplifiers 53 and the output from one of these amplifiers 53 is selected by means of a switch 54 to be applied to an output line 55.

The sensing head bracket 52 is secured to the worm drive wheel 56 which is loosely mounted on shaft 30, so that the wheel 56 may be adjusted about the shaft 30 by rotation of the worm 57 to modify the timing of the signals applied to the line 55.

It will be seen that rotation of the wheel 56 at a time when the brake 49 is effective causes the shaft 30 to be rotated by the same amount. This enables the extent of adjustment of the heads 51 to be observed in relation to consequential movement of the record 25.

The line 55 (FIGS. 1 and 2) is connected to the impulse driven motor 13 of the tape-sensing arrangement so that movement of the tape 10 is always synchronized to movement of the shaft 30 and hence to the movement of the record 25. The provision of two toothed wheels 50 on the shaft 30, the wheels 50 having teeth at different circumferential pitches respectively, allows the relative feeding speeds of the tape 10 and the record 25 to be altered to permit two alternative printing line spacing arrangements to be employed for the printing format of the record 25, the particular line spacing to be effective at any time being selected by the switch 54. The angular adjustment of the sensing heads 51 by means of the wheel 56 allows the actual position of a printing line on the record 25 to be adjusted.

Operation of the arrangements shown in FIG. 1 and 2 will now be described in greater detail with reference to the circuit diagram of FIG. 4, which shows, in block schematic form, the record-positioning arrangement applied to a printing apparatus 63. The printing apparatus 63 is arranged in conventional manner to print lines of characters in predetermined line positions on a record 25 (FIG. 2) and the record 25 is required to be positioned so that these lines are positioned in turn at a printing station, the selection of the required line positions being under control of a format tape 10 (FIG. 1). The printing apparatus 63 is arranged to produce a record movement initiating signal over a line 64 in the conventional manner, and this signal is required to cause the record 25 to be moved to bring a new line to rest at the printing station. The speed of movement of the record 25 is dependent upon the space between adjacent lines on which printing is required. If this space is below a predetermined length the movement is required to be at a slower speed, while for a longer movement of the record 25 the movement is required to be at a faster speed.

Figure 4:
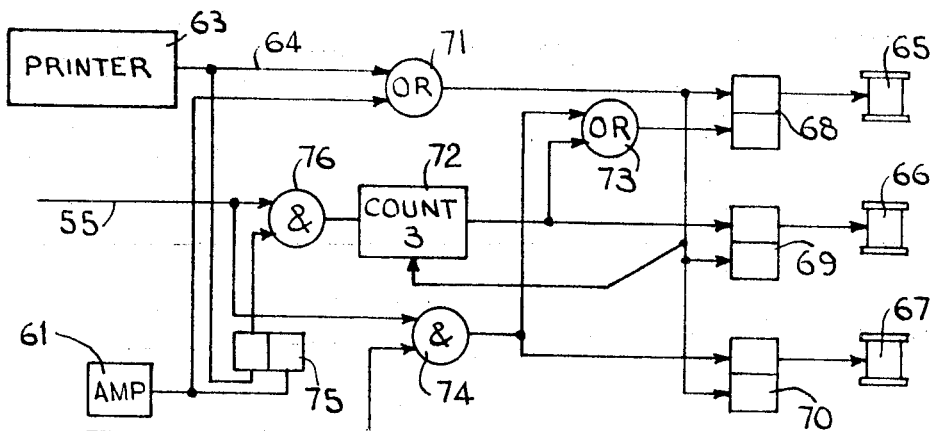
FIG. 4 is a block schematic circuit diagram of record positioning apparatus.

In the circuit arrangement shown in FIG. 4, the energizing coils for the slow speed clutch 37, the fast speed clutch 43 and the brake 49 of FIG. 2 are represented, respectively, as coils 65, 66 and 67. The coils 65, 66, 67 are respectively controlled by the outputs of flip-flops 68, 69 and 70. The selection of the slower speed movement is controlled by an OR gate 71, the output of which is connected to a set input of flip-flop 68 to energize the slow speed clutch coil 65, and also to reset inputs of flip-flops 69 and 70 to ensure that the fast speed clutch coil 66 and the brake clutch coil 67 are both deenergized. The selection of the faster speed is under control of a pulse counter 72, the output of which is connected to a set input of flip-flop 69 to cause the fast clutch coil 66 to be energized. The output of counter 72 is also connected to a reset input of flip-flop 68 through an OR gate 73 to deenergize the slow speed clutch coil 65. The flip-flop 70 is set to energize the brake coil 67 under control of an AND gate 74, the output of which is also applied to the OR gate 73 to reset flip-flop 68 and deenergize the slow speed clutch coil 65.

The AND gate 74 is controlled jointly by pulses on the line 55 and by the output of amplifier 60. The pulses on the line 55 are derived from the pulse generator amplifier 53 (FIG. 2), and are generated to represent all the possible printing line positions on the record 25 while the record 25 is being fed. A signal is produced by the amplifier 60 whenever a perforation 23 in the appropriate track is sensed by photoelectric cell 58 (FIG. 1).

The photoelectric cell 59 is spaced away from the cell 58 in the direction from which the record 25 is fed and therefore senses the perforation 23 in advance of the cell 58. The amplifier 61, to which the cell 59 is connected produces an output signal when the perforation 23 is sensed by the coil 59. The output from the amplifier 61 (FIG. 4) is applied to the slow speed control gate 71 and is also applied to reset a flip-flop 75. The flip-flop 75 is set by the movement initiating signal on line 64 and the set output of the flip-flop 75 is applied to condition an AND gate 76 between the input of counter 72 and the pulse generator output line 55. Thus, the counter 72 is enabled by the setting of the flip-flop 75 to count pulses on the line 55 but is inhibited from counting by the resetting of the flip-flop 75 in response to an output signal from amplifier 61.

The counter 72 is preferably arranged to produce an output signal after counting a number of pulses corresponding to the line-position separation of the sensing 111 and 112 represented by the photoelectric cells 58 and 59 (FIG. 1). In the present example these photoelectric cells 58 and 59 are separated by a distance corresponding to the passage of three consecutive printing line positions on the record 25 past the printing position of the printing apparatus 63, so that the counter 72 (FIG. 4) produces an output after counting three pulses. The counter 72 is reset by a slow speed control signal from the gate 71.

The operation of the apparatus will now be considered. The movement initiating signal from the printer 63 is applied over line 64 through OR gate 71 to set flip-flop 68 and to ensure that flip-flops 69 and 70 are reset. Setting of the flip-flop 68 causes the slow speed clutch coil 65 to be energized. Energization of the coil 65 causes the slow speed clutch 37 (FIG. 2) to be engaged, and the record 25 is moved at slow speed by the drive from the shaft 33 through the clutch 37, the shaft 30, the belt drive 27, 28, 29 to the platen 24. The rotation of the shaft 30 also activates the pulse generator 50, 51 to produce pulses from an amplifier 53 on line 55. These pulses are applied to the motor 13 (FIG. 1) to advance the program tape 10 past the tape sensing stations 111, 112 (photoelectric cells 58 and 59) and are also applied to the control circuit (FIG. 4).

The initiating signal passed by the OR gate 71 is also applied to reset the counter 72 to zero, and at the same time the initiating signal is applied directly from the printer 63 to set the flip-flop 75. The set output of flip-flop 75 opens AND gate 76 and allows the pulses from line 55 to pass to the counter 72. The counter 72 counts the pulses and if by the time the third pulse has been counted no perforation 23 has been sensed by the tape-sensing stations 111 and 112, the counter 72 produces an output signal which is applied directly to set flip-flop 69, and through an OR gate 73 to reset flip-flop 68. The flip-flops 68 and 69 then cause the slow speed clutch coil 65 to be deenergized and the fast speed clutch coil 66 to be energized respectively with the result that the feeding speed of the record 25 is increased.

When a perforation 23 in the format tape 10 (FIG. 1) is detected by the earliest sensing station 112, one of the photoelectric cells 59 of this station 112 produces a signal which is amplified by the amplifier 61 (FIG. 4). An output signal from the amplifier 61 is passed through OR gate 71 to set the flip-flop 68 once more and to reset the flip-flop 69. The signal from the OR gate 71 also passes to the reset inputs of the flip-flop 70 and the counter 72. Since, however, the flip-flop 70 is already reset, the reapplication of a signal to its input is redundant. Similarly, the resetting of the counter 72 is a redundant operation in this case. The setting of the flip-flop 68 reenergizes the slow speed clutch coil 65, and the resetting of the flip-flop 69 deenergizes the fast speed clutch coil 66, with the result that the feeding speed of the record 25 is once again decreased.

When the tape perforation 23 is detected by photoelectric cell 58 of the later sensing station 111, as shown in FIG. 1, a stop signal is produced by the amplifier 60 (FIGS. 1 and 4) and is passed through AND gate 74, when gate 74 is conditioned by an impulse on the line 55, to set the flip-flop 70 and through the OR gate 73 to reset the flip-flop 68. Thus the slow speed clutch coil 65 is deenergized and the brake coil 67 is energized, bringing the record 25 to rest with the line position represented by the tape perforation 23 at the printing position.

It will be apparent that the record movement is started at slow speed, and only if the next perforation 23 in the tape 10 is spaced more than by a distance representing six line positions is the fast speed clutch 43 brought into operation. If the next perforation 23 to be sensed by the later sensing station 111 in the tape advancing unit (FIG. 3) lies between the sensing station 111 and 112 when record feeding is initiated, the counter 72 will not have recorded a count of three, and will thus not have produced an output before the stop signal is produced by the amplifier 60. Hence the fast speed control flip-flop 69 will not have been set. If the next perforation 23 to be sensed is already positioned opposite the earlier sensing station 112, or is within a distance corresponding to three printing line positions of it, then a signal from the amplifier 61 will be applied to reset the flip-flop 75 and render the AND gate 76 inoperative to pass signals to the input of the counter 72. Thus, the counter 72 is inhibited before it can produce an output so that once again the movement of the record 25 at high speed is prevented.

The purpose of the control arrangements described is to ensure that the record feeding unit is brought to rest only from slow speed operation, in order that the possibility of poor positioning, due to attempting to arrest the unit while operating at fast speed, is reduced. Using the previously described control arrangement the feeding of the record 25 is initiated at slow speed and the fast speed operation is deferred. Under some circumstances it has been found that, in order to reduce the overall record feeding time, particularly when a number of long feeding operations are required, it is desirable that if a long feeding operation is to be performed the fast speed clutch 43 shall be energized as soon as feeding is initiated.

Figure 5:
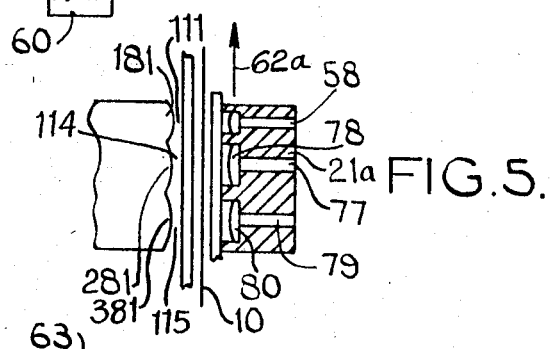
FIG. 5 is a sectional view showing a modification of part of the arrangement of FIG. 1.
Figure 6:
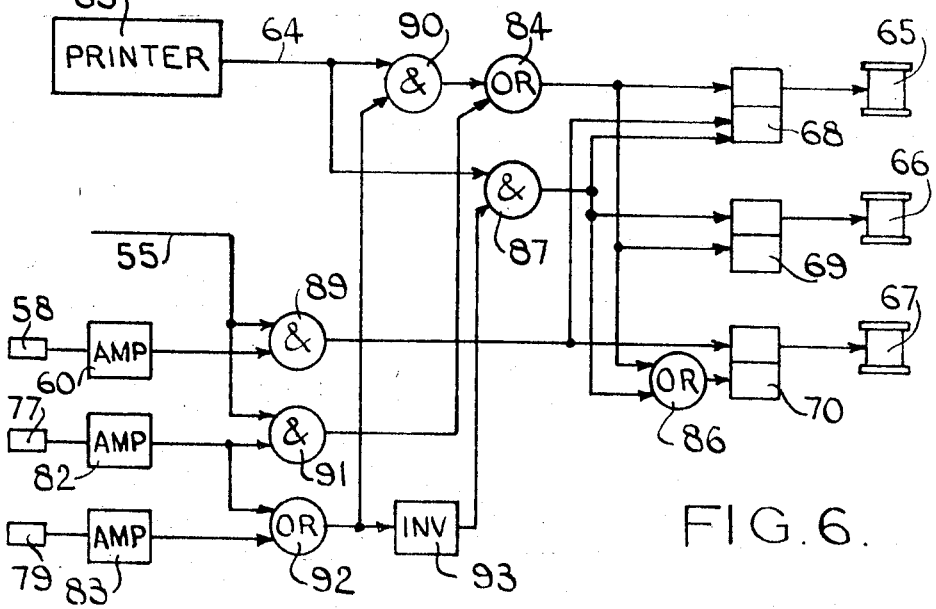
FIG. 6 is a block schematic diagram employing the modification of FIG. 5.

For this purpose, the tape-sensing arrangement of FIG. 1 may be modified, as shown in FIG. 5, by the addition of a third sensing station 115. As shown in FIG. 5, the block 21a carries sensing station 111 having photoelectric cells 58 in the same way as before. Adjacent the photoelectric cells 58 is intermediate sensing station 114 having photoelectric cells 77. The intermediate station 114 has a lens 78 arranged to scan an area across the tape 10 having a length along the tape 10 corresponding to three line positions of the record 25. The sensing station 115 adjacent the intermediate station 114 has photoelectric cells 79 and a lens 80 which scans an adjacent area of tape 10 similar in size to that scanned by the lens 78. Lens 80 is displaced from lens 78 in the direction from which the tape 10 is advanced, the direction of tape advance being shown by arrow 62a. In order to illuminate the areas of tape 10 scanned by the lenses 78 and 80, the light-reflecting block 19 is modified to provide three lenses 181, 281, and 381 associated with sensing stations 111, 114, and 115, respectively, instead of the two previously referred to. The photoelectric cells 58, 77, 79 are connected respectively to amplifiers 60, 82, and 83, as shown in FIG. 6, which shows in schematic form a modified control circuit.

In this circuit the slow speed flip-flop 68 is set under control of an OR gate 84, the output of which also resets the fast speed flip-flop 69 and the brake flip-flop 70 through an OR gate 86. The fast speed flip-flop 69 is set under control of an AND gate 87 the output of which also resets the slow speed flip-flop 68 and the brake flip-flop 70 through an OR gate 86. The brake flip-flop 70 is set under control of an AND gate 89, the output of which also resets the slow speed clutch flip-flop 68.

The slow speed control OR gate 84 is controlled by an AND gate 90 or by an AND gate 91. AND gate 90 is conditioned by signals derived from amplifiers 82 or 83 through an OR gate 92. The output of the OR gate 92 is also inverted by an inverter 93 and the inverted output is passed to condition AND gate 87. The initiating signal line 64 from the printer 63 is connected to both AND gates 87 and 90.

The AND gate 89 is conditioned by the output from amplifier 60, while the AND gate 91 is conditioned by the output from the amplifier 82. Pulses from the pulse generator (wheels 50 and receiving heads 51 in FIG. 2) in the record feeding control unit (FIG. 2) are passed over line 55 (FIGS. 2 and 6) to both AND gates 89 and 91.

In operation, the feed initiating signal from the printer 63 is passed to AND gates 87 and 90. If a tape perforation 23 is present in the areas of tape 10 scanned by either of the advanced tape-sensing stations 114, 115 (photoelectric cells 77, 79) at this time, the amplifier 82 or the amplifier 83 will be producing an output signal. A resultant signal will appear at the output of OR gate 92 to condition AND gate 90 to pass the initiating signal from line 64. This condition causes the slow speed fliplflop 68 to be set to energize the slow speed clutch 37. If, on the other hand, no tape perforation 23 is present at either of the advanced sensing stations 114 and 115, neither amplifier 82 nor amplifier 83 will be producing an output. Thus, there will be no output from OR gate 92 to condition AND gate 90. In the absence of an output from OR gate 92, however, the inverter 93 will produce an output to condition AND gate 87 to pass the initiating signal from line 64 to set the fast speed flip-flop 69 and energize the high-speed clutch coil 66.

Thus, in dependence upon whether or not there is a perforation 23 within a distance representing six line positions of the advanced tape sensing stations 114, 115 at the time when the initiating signal is produced by the printer 63, either the slow or fast speed drive respectively, is directly selected to feed the record 25.

As in the previous case, when a perforation 23 is sensed by one of the photoelectric cells 77, the output of a signal from the amplifier 82 is applied through AND gate 91 and OR gate 84 to set the slow speed flip-flop 68 and to reset the fast speed flip-flop 69 to ensure that the speed of feeding is reduced to the slower speed before feeding is stopped. If the slower speed of feeding has already been selected by virtue of the starting condition, then this slowdown operation is redundant.

When a perforation 23 is detected at the tape-sensing station 111, an output from amplifier 60 through AND gate 89 sets the brake flip-flop 70 and resets the slow speed flip-flop 68 to bring the record 25 to rest.

It will be appreciated that the modified sensing arrangement of FIG. 5 permits the direct selection of the higher speed feeding of the record 25 without the need for the initial slower speed start as described with reference to the sensing arrangement of FIG. 1. However, the use of the counter 72 shown in FIG. 4 serves the same purpose as the advanced sensing station 115 of FIG. 5 in determining the minimum distance between perforations 23 on the tape 10 for which a higher speed feeding operation is altogether inhibited. Thus, if it is required to alter this minimum distance either the capacity of the counter 72 may be altered, or the extent of the area of tape 10 along the tape 10 scanned by the photoelectric cells 79 may be altered. Again, the distance that the earlier sensing station 112 of FIG. 1 is displaced from the final station 111 effectively determines the deceleration time allowed for bringing the record 25 to rest, as does the extent of the area along the tape 10 scanned by the photoelectric cells 77 of FIG. 5. Thus if it is required to alter this deceleration period, the spacing of the sensing stations 112 and 111 of FIG. 1 may be altered, or the extent of the area scanned by the photoelectric cells 77 of FIG. 5 may be altered.

The description above has referred to the presence of a perforation in the tape in relation to a line of photoelectric cells at each station, and that a single amplifier for each station has been described. It will be realized that in practice a number of tracks are provided across the tape and perforations may be recorded in any of these tracks, the particular function of the perforation being dependent upon the track in which it occurs, in the conventional manner. Thus, in dependence upon the particular printing operation to be performed various ones of the tracks may be recognized as carrying record-arresting signals. For the sake of simplicity only a single amplifier has been referred to in the present description for each station, the amplifier being regarded as a source of any signals derived from the tracks for the purpose of arresting the feeding of the record. It will be appreciated that, in practice, a more complex arrangement requiring the use of more than one output amplifier for each station may be used. However, all feed-stop signals derived from any track would be applied in the way described to control the selection of record feeding speeds.

It will be also apparent that although the use of a perforated tape has been described, other forms of indicia than perforations may be used. For example, a paper tape may carry optically detectable marks or a magnetic program tape may carry magnetically recorded indicia, in which case the sensing devices at the sensing stations would be magnetic sensing heads instead of the photoelectric cells described.

We claim:

1. A record-position-controlling apparatus, including a program tape bearing at least one indicium, means for advancing said program tape in a direction parallel to its length; a motor operable in response to electrical impulses coupled to drive said tape-advancing means, first and second sensing stations spaced apart along the length of the program tape; each station respectively producing a signal in response to sensing of an indicium from said program tape, means for feeding a record; two-speed driving means; coupling means between said driving means and the record feeding means; said coupling means being operable to transmit drive to the record feeding means at a selected one of the two speeds, the coupling means including means for generating electrical impulses at a frequency dependent upon the selected speed; means for applying said electrical impulses to said motor to synchronize movement of the record and said program tape; and control means for operating said coupling means; including speed-modifying means responsive to a signal produced by said first sensing station and to said electrical impulses to modify the operation of said coupling means to select the slower of said two speeds and means responsive to a signal produced by said second sensing station and to said electrical impulses to disable said coupling means to bring to rest a record being fed; a third sensing station spaced away from said second sensing station in the direction from which the tape is advanced, said third sensing station producing a signal in response to sensing of an indicium from the tape; and means for producing a record movement initiating signal; said control means further including means responsive to said initiating signal to select the faster of said two speeds in the absence of signals produced by both said first and third sensing stations and to select the slower of said two speeds if a signal is produced by at least one of the first and third sensing stations concurrently with said initiating signal.

2. Apparatus as claimed in claim 1 including a printer operable to print characters in predetermined line on a record fed by said record-feeding means, the printer being arranged to print at a predetermined printing position a single line of characters in one operation; in which said electrical impulses correspond respectively one to each of the lines on the record in which characters may be printed; in which the program tape carries indicia corresponding to lines in which characters are required to be printed; in which said second sensing station is so positioned relative to the program tape that in response to the occurrence of a signal produced by said second sensing station the record is brought to rest with the corresponding line at said printing position; and in which said first and third sensing stations are spaced away from said second sensing station in the direction from which said program tape is advanced respectively to scan successive areas of the program tape adjacent the second sensing station, said successive areas each extending along the length of the tape to a distance corresponding to at least twice the spacing between adjacent ones of said line positions on the record in which characters may be printed.